(12) United States Patent
Reichenbach et al.

(10) Patent No.: US 9,632,860 B2
(45) Date of Patent: Apr. 25, 2017

(54) MULTICORE PROCESSOR FAULT DETECTION FOR SAFETY CRITICAL SOFTWARE APPLICATIONS

(71) Applicant: ABB Schweiz AG, Baden (CH)

(72) Inventors: Frank Reichenbach, Regensburg (DE); Harald Vefling, Notteroy (NO); Jan Endresen, Slependen (NO); Trond Loekstad, Nesoddtangen (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/896,690

(22) PCT Filed: May 9, 2014

(86) PCT No.: PCT/EP2014/059529
§ 371 (c)(1),
(2) Date: Dec. 8, 2015

(87) PCT Pub. No.: WO2014/198464
PCT Pub. Date: Dec. 18, 2014

(65) Prior Publication Data
US 2016/0117210 A1    Apr. 28, 2016

(30) Foreign Application Priority Data

Jun. 11, 2013 (EP) .................................... 13171337

(51) Int. Cl.
*G06F 11/00* (2006.01)
*G06F 11/07* (2006.01)

(52) U.S. Cl.
CPC ........ *G06F 11/079* (2013.01); *G06F 11/0712* (2013.01); *G06F 11/0724* (2013.01); *G06F 11/0751* (2013.01); *G06F 11/0787* (2013.01)

(58) Field of Classification Search
CPC .............. G06F 11/079; G06F 11/0712; G06F 11/0724; G06F 11/0751; G06F 11/0787
See application file for complete search history.

(56) References Cited

U.S. PATENT DOCUMENTS 4,631,722 A    12/1986  Voss
6,434,712 B1    8/2002  Urban et al.
(Continued)

FOREIGN PATENT DOCUMENTS

DE    3303791 A1    8/1983
EP    2813949 A1    12/2014

OTHER PUBLICATIONS

"Wind River VxWorks 653 Platform 2.3", Rev. Apr. 2010, pp. 1-10 Retrieved from Internet Archive Wayback Machine: https://web.archive.org/web/20130314064013/http://windriver.com/products/product-notes/PN_VE_653_Platform2_3_0410.pdf.*

(Continued)

*Primary Examiner* — Michael Maskulinski
*Assistant Examiner* — Anthony J Amoroso
(74) *Attorney, Agent, or Firm* — Whitmyer IP Group LLC (57) ABSTRACT

A method for multicore processor fault detection during execution of safety critical software applications in a multicore processor environment involves dedicating the complete resources of at least a part of at least one processor core to execution of diagnostics software application whilst dedicating remaining resources to execution of a safety-critical software application, thereby enabling parallel execution of the diagnostics software application and the safety-critical software application. There is also provided a controller for multicore processor fault detection during execution of safety critical software applications in a multicore processor environment. The controller includes a multicore processor (Continued)

environment. The controller may be part of a control system. The method may be provided as a computer program.

14 Claims, 5 Drawing Sheets

(56) References Cited

U.S. PATENT DOCUMENTS

| | | | |
|---|---|---|---|
| 7,206,966 B2 | 4/2007 | Barr et al. | |
| 7,415,700 B2 | 8/2008 | Pomaranski et al. | |
| 8,140,902 B2 | 3/2012 | Floyd et al. | |
| 2006/0150015 A1* | 7/2006 | Kondajeri | G06F 11/0712 714/23 |
| 2012/0221884 A1* | 8/2012 | Carter | G06F 11/0772 714/2 |
| 2013/0268798 A1* | 10/2013 | Schade | G06F 11/1487 714/3 |

OTHER PUBLICATIONS

F. Reichenbach and A. Wold, "Multi-core Technology—Next Evolution Step in Safety Critical Systems for Industrial Applications?," Digital System Design: Architectures, Methods and Tools (DSD), 2010 13th Euromicro Conference on, Lille, 2010, pp. 339-346.*

"Wind River VxWorks 653 Platform 2.3", Jan. 1, 2010 (Jan. 1, 2010), pp. 1-10, Retrieved from the Internet: URL: http://www.windriver.com/products/prod uct-notes/PN VE 653 Platform2-3-0410.pdf [retrieved on Sep. 26, 2013].

European Search Report Application No. 13171337.2 Completed: Oct. 18, 2013 9 pages.

International Preliminary Report on Patentability Application No. PCT/EP2014/059529 Completed: Sep. 29, 2015; Mailing Date: Sep. 29, 2015 7 pages.

International Search Report and Written Opinion of the International Searching Authority Application No. PCT/EP2015/059529 Completed: Mar. 26, 2015; Mailing Date: Apr. 8, 2015 14 pages.

Reichenbach F, et al., "Multi-core Technology—Next Evolution Step in Safety Critical Systems for Industrial Applications?", 13th Euromicro Conference on Digital System Design: Architectures, Methods and Tools; Sep. 1-3, 2010, Lille, France, IEEE, US, Sep. 1, 2010 (Sep. 1, 2010), pp. 339-346.

Victor Lopez-Jaquero, et al., "Supporting ARINC 653-based Dynamic Reconfiguration", Software Architecture (WICSA) and European Conference on Software Architecture (ECSA), 2012 Joint Working IEEE/IFIP Conference on, IEEE, Aug. 20, 2012 (Aug. 20, 2012), pp. 11-20.

Written Opinion of the International Preliminary Examining Authority Application No. PCT/EP2014/059529 Mailing Date: Aug. 26, 2015 5 pages.

* cited by examiner

MULTICORE PROCESSOR FAULT DETECTION FOR SAFETY CRITICAL SOFTWARE APPLICATIONS

FIELD OF THE INVENTION

Embodiments presented herein relate to multicore processor fault detection, and particularly to multicore processor fault detection for safety critical software applications.

BACKGROUND OF THE INVENTION

Industrial control systems are for instance applied in manufacturing and process industries, such as chemical plants, oil production plants, refineries, pulp and paper mills, steel mills and automated factories. Industrial control systems are also widely used within the power industry. Such an industrial control system may comprise or may be combined with certain devices adding safety features. An example of such a device is a safety controller. Example of processes which requires additional safety features other than what a standard industrial control system provides are processes at off-shore production platforms, certain process sections at nuclear power plants and hazardous areas at chemical plants. Safety features may be used in conjunction with safety shutdown, fire and/or alarm systems as well as for fire-and-gas detection.

The use of complex computer systems relating to industrial control systems with added safety features raises challenges in the increased need for error-free execution of software in an industrial controller.

The standard IEC 61508 outlines requirements for systems consisting of hardware and software, grouped into the following equipment failure categories:

Random hardware failures can be either permanent or transient. Permanent failures exist until repaired. Transient failures can be resolved by measures to control failures (by employing detection and correction mechanisms).

Systematic failures can exist in hardware and software. In general terms, systematic failures can only be eliminated if found during system (home) or proof (site) testing. Measures on how to avoid systematic failures are specified in the above referenced standard. Typically avoidance of systematic failures is handled through good design procedures and measures for detecting design flaws, while control of systematic failures can be achieved with diversity etc.

Common cause failures are the result of one or more events, causing concurrent failures of two or more separate channels in a multiple channel system, leading to system failure. Common cause failures are typically caused by environmental issues (such as temperature, EMC, etc.) at the same time in redundant hardware (safety function carried out more than once). In general terms, diversity introducing differences in hardware, design, or technology, may reduce this kind of errors.

Current multicore processors do not satisfy HFT=1 according to Appendix E in IEC 61508-2. It may be possible to enable internal core to core redundancy, but issues concerning diversity still remain when executing two copies of the safety critical application on the same silicon. This can to some extent be solved by using different design principles or completely different technology to carry out the same safety critical functionality.

When using multicore processors for safety applications there is thus a need for on-line diagnostic testing of the processors, and in particular of the processor cores. The diagnostic software normally runs as a background task and thus competes for the processing power with the safety application. Thereby the benefits of using a multicore processor may be lost.

Hence there is still a need for improved safety considerations for safety critical software applications in industrial control systems.

SUMMARY OF THE INVENTION

An object of embodiments herein is to provide improved safety considerations for safety critical software applications in industrial control systems.

To reduce the effects of the above noted problem the inventors of the present invention have realized that the diagnostics software should be designed such that its execution does not interfere with the execution of the safety application. A particular object is therefore to provide improved safety considerations for safety critical software applications in industrial control systems without interfering with the execution of the safety application.

According to a first aspect there is presented a method for multicore processor fault detection during execution of safety critical software applications in a multicore processor environment. The method comprises partitioning processor cores of the multicore processor environment into at least two logical units. The method comprises dedicating all processing resources of one of the at least two logical units to execution of a diagnostics software application, DSA, the DSA being arranged for fault detection of a processor core of said one of the at least two logical units. The method comprises dedicating processor resources of at least one of the remaining logical units to execution of a safety-critical software application, SSA. The method comprises executing the DSA by said one of the at least two logical units whilst in parallel executing the SSA by said at least one of the remaining logical units.

Advantageously the method provides improved safety considerations for safety critical software applications in industrial control systems. Advantageously the method enables improved safety during execution of the SSA. By performing the diagnostic testing in this way the execution efficiency in the multicore processor environment is increased because there is no need for task switching. Advantageously the method thus enables improved safety without relying on diagnostics being performed as background tasks, and thus without relying on task switches. Advantageously the method enables optimized execution of diagnostics functionality (as provided by the DSA). Advantageously the method provides an improved fault tolerant system with higher uptime for execution of the SSA. Advantageously the method is scalable to any number of cores. Advantageously the method does not rely on static allocation of cores. Advantageously the partitioning enables improved utilization of cores with increased diagnostic coverage.

The diagnostic test software can also test the cores that are normally used for non-safe applications. The disclosed method can also be used for increasing the availability of computing resources since a core that is not error free can be marked as unavailable (faulty) and the applications (safety critical as well as non-safety critical) can be executed by the remaining cores. The disclosed method can be combined with a safety application simultaneously being executed by multiple cores for increased redundancy.

According to a second aspect there is presented a controller for multicore processor fault detection during execution of safety critical software applications in a multicore processor environment. The controller comprises a multicore processor environment. The multicore processor environment is arranged to partition processor cores of the multicore processor environment into at least two logical units. The multicore processor environment is arranged to dedicate all processing resources of one of the at least two logical units to execution of a diagnostics software application, DSA, the DSA being arranged for fault detection of a processor core of said one of the at least two logical units. The multicore processor environment is arranged to dedicate processor resources of at least one of the remaining logical units to execution of a safety-critical software application, SSA. The multicore processor environment is arranged to execute the DSA by said one of the at least two logical units whilst in parallel executing the SSA by said at least one of the remaining logical units.

According to a third aspect there is presented a control system comprising at least one controller according to the second aspect.

According to a fourth aspect there is presented a computer program for multicore processor fault detection during execution of safety critical software applications in a multicore processor environment, the computer program comprising computer program code which, when run on a controller, causes the controller to perform a method according to the first aspect.

According to a fifth aspect there is presented a computer program product comprising a computer program according to the fourth aspect and a computer readable means on which the computer program is stored. The computer readable means may be non-volatile computer readable means.

It is to be noted that any feature of the first, second, third, fourth and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
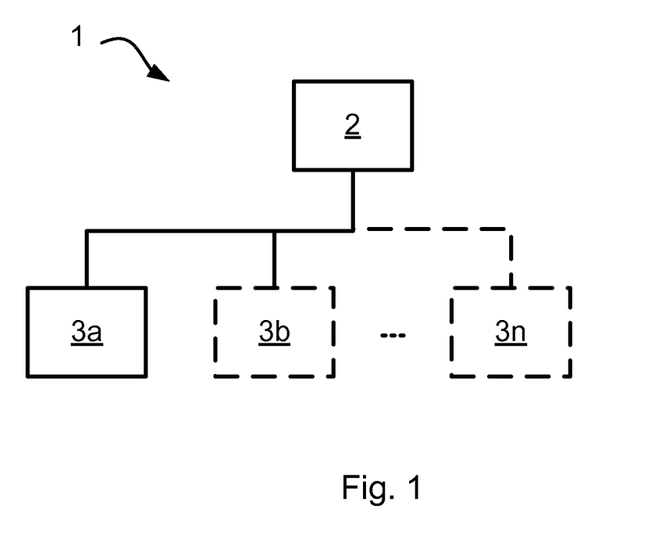
FIG. 1 is a schematic diagram illustrating a control system where embodiments presented herein may be applied.

FIG. 1 is a schematic diagram illustrating a control system 1 where embodiments presented herein can be applied. The control system 1 will be described in a state of operation. The control system 1 comprises at least one control object 3a. As illustrated in FIG. 1 the control system 1 may comprise a plurality of such control objects 3a, 3b, ..., 3n. Examples of real world control objects subject to safety control are sensors, actuators, valves, motors, drive systems and fans. Further examples are gas/smoke/fire detection systems, drilling equipment, pipes and pipelines, distillation columns, compressors, conveyor systems, boilers and turbines.

The at least one control object 3a-n is subject to safety control by a controller 2. The controller 2 is operatively connected to the at least one control object 3a-n so as to enable safety control of the at least one control object 3a-n. The controller 2 is thereby arranged to control operations of the at least one control object 3a-n. Communications between the controller 2 and the at least one control object 3a-n is per se performed in any suitable, known, manner and includes exchanging various signals and/or messages between the controller 2 and the at least one control object 3a-n.

Figure 3:
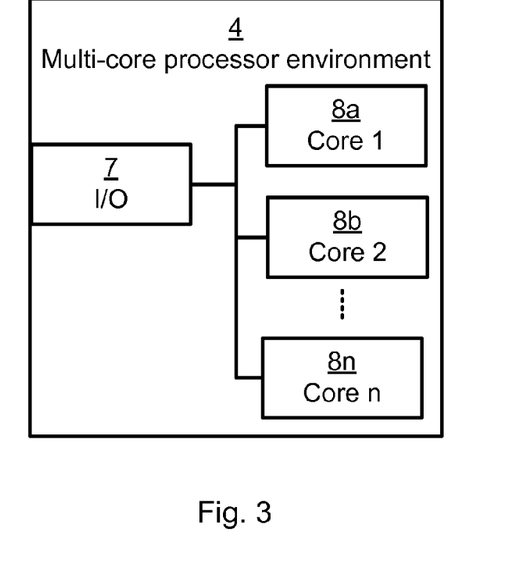
FIG. 3 is a schematic diagram showing functional modules of a multicore processor environment.

As will be further disclosed below, the controller 2 inter alia comprises a multicore processor environment 4. A multicore processor environment 4 may enable improved safety during control of the at least one control object 3a-n. FIG. 3 schematically illustrates a multicore processor environment 4. The multicore processor environment 4 comprises at least two processor cores 8a, 8b. In general, the multicore processor environment 4 may comprise a plurality of processor cores 8a, 8b, ..., 8n. A multicore processor environment 4 with two processor cores 8a, 8b is referred to as a dual-core processor; a multicore processor environment 4 with four processor cores is referred to as a quad-core processor. The processor cores 8a-n of the multicore processor environment 4 are arranged for external communications (i.e., outside the multicore processor environment 4) via an input/output (I/O) interface 7. The multicore processor environment 4 may further comprise at least one internal memory; for example, each processor cores 8a-n may be associated with its own cache memory.

The embodiments disclosed herein relate to multicore processor fault detection during execution of safety critical software applications in a multicore processor environment 4. In order to obtain improved multicore processor fault detection during execution of safety critical software applications in a multicore processor environment 4 there is provided a controller 2 comprising a multicore processor environment 4, a method performed by the controller 2, a computer program 10 comprising code, for example in the form of a computer program product 9, that when run on the controller 2, causes the controller 2 to perform the method.

Figure 2:
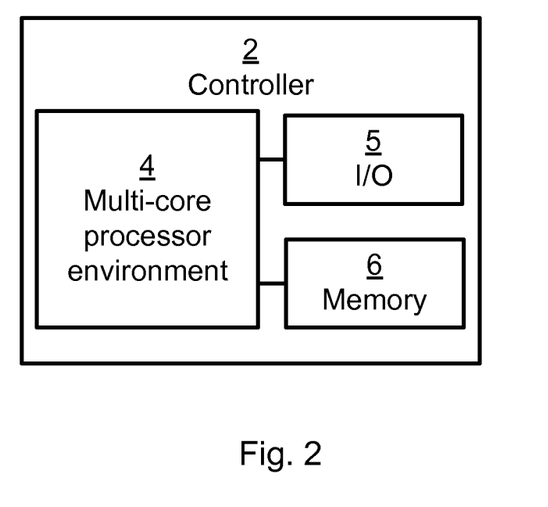
FIG. 2 is a schematic diagram showing functional modules of a controller.

FIG. 2 schematically illustrates, in terms of a number of functional modules, the components of a controller 2. The controller 2 comprises a multicore processor environment 4 as described above. The multicore processor environment 4 is provided using any combination of a suitable number of central processing units (CPUs), multiprocessors, microcontrollers, digital signal processors (DSPs), application specific integrated circuits (ASICs), field programmable gate arrays (FPGAs) etc., capable of executing software instructions in a multicore processor environment 4. The software instructions are stored in a computer program product 9 (as in FIG. 4), e.g. in the form of a memory 6. Thus the multicore processor environment 4 is thereby arranged to execute methods as herein disclosed. The memory 6 may also comprise persistent storage, which, for example, can be any single one or combination of magnetic memory, optical memory, solid state memory or even remotely mounted memory. The controller 2 may further comprise an input/output (I/O) interface 5 for receiving and providing information to at least one control object 3a-n. The multicore processor environment 4 controls the general operation of the controller 2, e.g. by sending control signals to the I/O interface 5 and memory 6. Other components, as well as the related functionality, of the controller 2 are omitted in order not to obscure the concepts presented herein.

Figure 4:
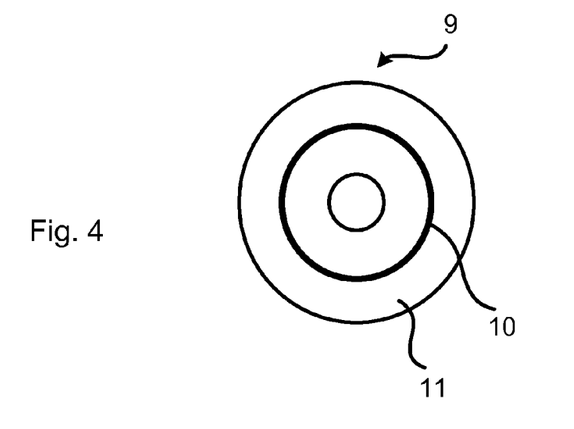
FIG. 4 shows one example of a computer program product comprising computer readable means.
Figures 5, 6:
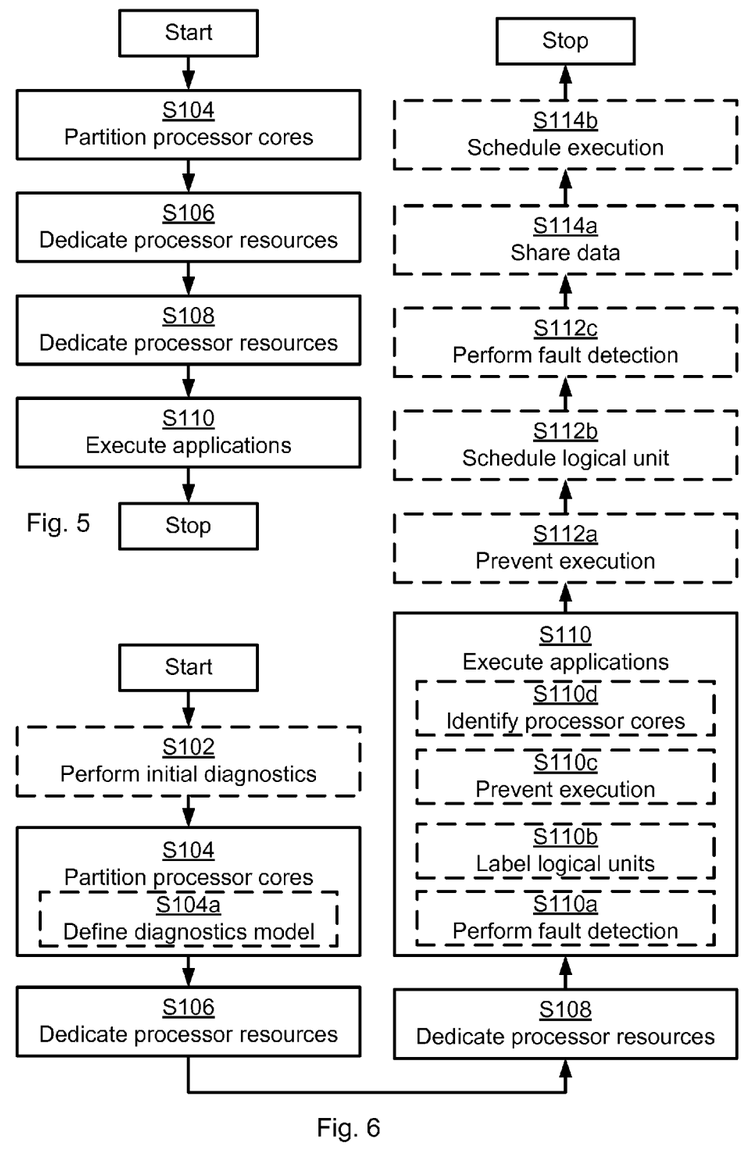
FIGS. 5 and 6 are flowcharts of methods according to embodiments.

FIGS. 5 and 6 are flow charts illustrating embodiments of methods for multicore processor fault detection during execution of safety critical software applications in a multicore processor environment 4. The methods are performed in the controller 2. The methods are advantageously provided as computer programs 10. FIG. 4 shows one example of a computer program product 9 comprising computer readable means 11. On this computer readable means 11, a computer program 10 can be stored, which computer program 10 can cause the multicore processor environment 4 and thereto operatively coupled entities and devices, such as the memory 6 and the I/O interface 5 to execute methods according to embodiments described herein. In the example of FIG. 4, the computer program product 9 is illustrated as an optical disc, such as a CD (compact disc) or a DVD (digital versatile disc) or a Blu-Ray disc. The computer program product 9 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 10 is here schematically shown as a track on the depicted optical disk, the computer program 10 can be stored in any way which is suitable for the computer program product 9.

When testing safety-critical software applications (SSA) executed in a multicore processor environment the diagnostics software application (DSA) is normally executed as a background task and thus competes for the processing power with the SSA. This may lead to task switching. That is, one processor core 8a-n switches between executing parts of the SSA and executing parts of the DSA. Instead of having the DSA executed as a background task, the DSA is according to the herein disclosed embodiments enabled to take over one complete processor core 8a-n (or part thereof) whilst the SSA is executed by another processor core 8a-n. That is, the complete resources of one processor core 8a-n may be dedicated to execution of the DSA and resources of the remaining processor cores 8a-n are dedicated to execution of the SSA. This enables parallel execution of the DSA and the SSA. According to the present invention, there is thus provided mechanisms for multicore processor fault detection during execution of safety critical software applications in a multicore processor environment, enabling parallel execution of a diagnostics software application (DSA) and the safety-critical software application (SSA). Before disclosing these mechanisms, the following notations and definitions are introduced.

AMP (Asymmetric Multiprocessing) provides an execution environment that is similar to conventional uniprocessor systems. It offers a straightforward path for porting legacy code and provides a direct mechanism for controlling how the CPUs are used. In most cases, it enables standard debugging tools and mechanisms to be used. AMP can be homogeneous (where each CPU runs the same type and version of the Operating System, OS) or heterogeneous (where each CPU runs either a different OS or a different version of the same OS).

sAMP (supervised Asymmetric Multiprocessing) is similar to AMP with a virtualization layer between OS's and CPUs serving as a virtual machine monitor to run and execute virtual machines (a so-called Kernel-based Virtual Machine, KVM).

SMP (Symmetric Multiprocessing) is executed using only one copy of the OS on all of the system's CPUs. Because the OS has insight into all system elements at all times, it can allocate resources on the multiple CPUs with little or no input from the application designer using spinlock for shared resources.

BMP (Bound Multiprocessing) provides the scheduling control of an asymmetric multiprocessing model, while preserving the hardware abstraction and management of symmetric multiprocessing. BMP is similar to SMP, but enables specification of which processors a thread can run on. Both SMP and BMP can be used on the same system, allowing some threads to migrate from one processor to another, while other threads are restricted to one or more processors.

A HV (Hypervisor) allows a developer to securely run one or more operating systems (or multiple instances of the same OS) in defined partitions (herein also denoted logical units). In general terms, it controls access to memory, peripherals, and other assigned resources to ensure no OS steps outside its bounds. Shared or unique resources like the interrupt controller are strictly managed.

The MMU (Memory Management Unit) is a computer hardware component responsible for handling access to memory requested by a CPU. It translates virtual addresses to physical addresses (virtual memory management). For a multicore processor environment there are typically several MMUs and often one for each core 8a-n. The same kind of unit is used for peripheral access protection (PAMU).

The CPU (Central Processing Unit) used in conjunction with Multicore refers to all hardware resources contained in the single core domain and replicated for each core 8a-n. This is due to increased core complexity including resources like the core 8a-n itself with registers and instructions, first level cache (L1+L2), MMU, temperature sensor, clocking, power supervision, etc. (almost a full scale CPU without peripherals). In this disclosure the notation CPU, processing core, and core will be used with the same meaning.

RTOS (Real Time Operating System) is an operating system with real time behavior. It is compact and deterministic without time consuming functionality. It is normally driven by a scheduler activated by regular timer ticks and interrupts. It offers an API (Application Programming Interface) to the application and manages all resources by controlling tasks (or threads) and executing drivers.

A VM (Virtual Machine) is a software implementation of a machine that executes programs like a physical machine. In an embedded context this means a machine that provides a complete system platform (emulating existing architecture) supporting execution of one or several operating systems. The hardware complexity (one or several CPUs) is hidden for the user.

The Privilege mode (User, Supervisor, and Hypervisor mode) decides which entity or device is allowed to access what information in a layered approach. For traditional single core processors the two privilege modes Supervisor and User exists, where typically the RTOS is executing with the highest privilege (also called Kernel mode). Applications are typically executed in User mode without access to Kernel privileges. With Multicore the new Hypervisor privilege mode is added above the Kernel mode adding another layer of hardware protection.

A Process (in the context of RTOS) is a program loaded into memory uniquely identified owning resources as memory with code and data, open devices/files, etc. all protected from other processes. It is an encapsulation mechanism protecting internal from external violation.

Threads (in the context of RTOS) are single flows of execution or control with its own priority, scheduling algorithm, register set and mask, etc. required by a running code. Threads run in a process and share all the process resources. At least one thread must run within a process.

A Platform is a generic term referring to both hardware and software functionality supporting application development. This means both tools and libraries. Herein it refers to the API served by the RTOS with supported drivers.

Partition is a way to divide one or several physical devices into one or multiple logical units. In multicore executing SMP the entire multicore may be regarded as one partition, while when executing AMP each core $8a$-$n$ may be regarded as a separate partition. In the traditional configuration with two redundant single chip CPUs (from same or different manufactures) it is referred to as two partitions.

A Safety Channel (SC) is a channel that is able to perform the safety function. E.g. in a 1oo2 (one out of two) architecture either of the two channels can perform the safety function, meaning if one channel fails the other is still able to bring the system to a safe state.

A Black Channel is a safe way to transport information between several parties independent of the media. The information sent out is tagged in such a way that if changed on its way this is detected on the receiving side.

Failure Rate ($\lambda$) is a measure of failure per unit of time. The useful failure rate is based on the exponential distribution. The failure rate typically decreases slightly over early life, and then stabilizes until wear-out which shows an increasing failure rate. This should occur beyond useful life. In the stabilized period $\lambda$ can be expressed in FIT (see below).

FIT (Failure In Time) is the frequency at which an engineered system or component fails. E.g. 1 FIT=1 failure per $10^9$ device hours ($1*10^{-9}$). Often Mean Time Between Failures (MTBF) is reported instead of the failure rate due to a more intuitive representation.

Figure 7:
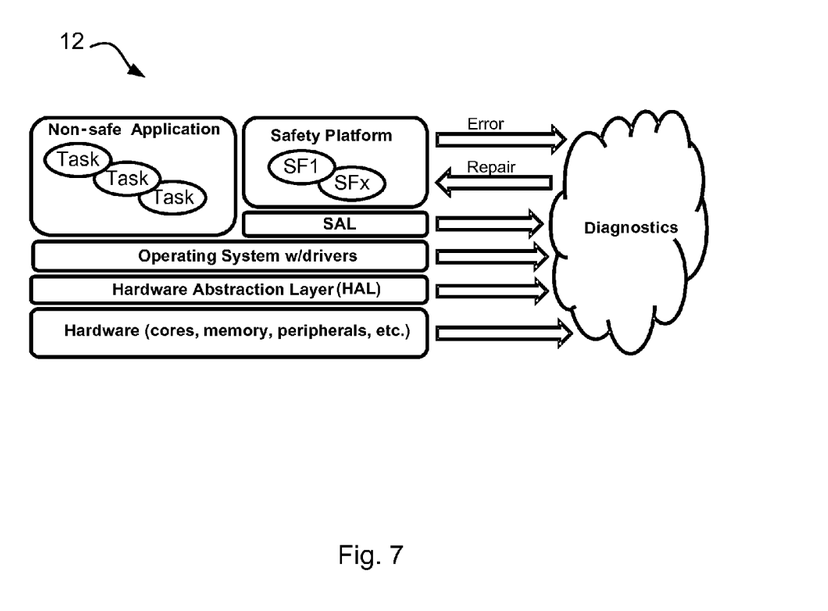
FIG. 7 schematically illustrates a real time operating system platform.

FIG. 7 schematically illustrates a RTOS platform 12 supporting dynamic adaptive partitioning arranged to dynamically reconfigure an execution model. The architectural view shows a logical layered model with diagnostics for safety, safety functions, and non-safe application. The Safety Platform (SP) consists of one or more partitions, or Safety Channels (SC), which can execute a required number of different safety-critical software applications (SSAs).

A method for multicore processor fault detection during execution of safety critical software applications in a multicore processor environment 4 comprises in a step S104 partitioning processor cores 8a-n of the multicore processor environment 4 into at least two logical units. The step S104 of partitioning is performed by the controller 2. As will be further disclosed below, a logical unit may correspond to a safety channel (SC). The step of partitioning is performed in order to dedicate processing resources of the multicore processor environment 4 to a diagnostics software application (DSA) and to a safety-critical software application (SSA) such that respective executions thereof do not interfere with one another. The DSA comprises a set of software instructions and is arranged for fault detection of a processor core 8a-n in the multicore processor environment 4 by operating on a logical unit. The SSA may be a Safety Function (SF) control application of an industrial control system. The control application may thereby relate to on-line safety control of real-world control objects. Example of such on-line safety control and of such real-world control objects have been provided above. The controller 2 is arranged to, in a step S106, dedicate all processing resources of one of the at least two logical units to execution of the DSA. The controller 2 is further arranged to, in a step S108, dedicate processor resources of at least one of the remaining logical units to execution of the SSA. After having dedicated processing resources for execution of the DSA and the SSA, respectively, the DSA and the SSA may be executed in parallel on different logical units. The controller 2 is therefore arranged to, in a step S110, execute the DSA by said one of the at least two logical units whilst in parallel executing the SSA by said at least one of the remaining logical units.

There may be different ways of determining the partitioning in step S104. According to one embodiment the SSA is only executed on a subset of the available processor cores 8a-n. The DSA may then be executed only on those processor cores 8a-n. According to one embodiment the controller 2 is therefore arranged to, in an optional step S110d, identify all processor cores 8a-n on which the SSA is executed and executing the DSA, as in step S110, only on the identified processor cores 8a-n.

According to one embodiment each logical unit corresponds to a fractional part of the at least one processor core 8a-n. According to another embodiment each logical unit corresponds to an integer number of processor cores 8a-n. According to one embodiment each logical unit corresponds to one safety channel (SC). A SC may thus correspond to a fractional part of the at least one processor core 8a-n or an integer number of processor cores 8a-n. The controller 2 may therefore be arranged to, in an optional step S104, define a diagnostics model comprising at least one safety channel. The DSA may then be executed at least on all logical partitions associated with the at least one safety channel. The Safety Abstraction Layer (SAL) is a thin layer interfacing required RTOS and drivers making all that is safety-related independent of OS and drivers. If redundancy is required it will have at least two SCs with DSA replicated.

Figure 8:
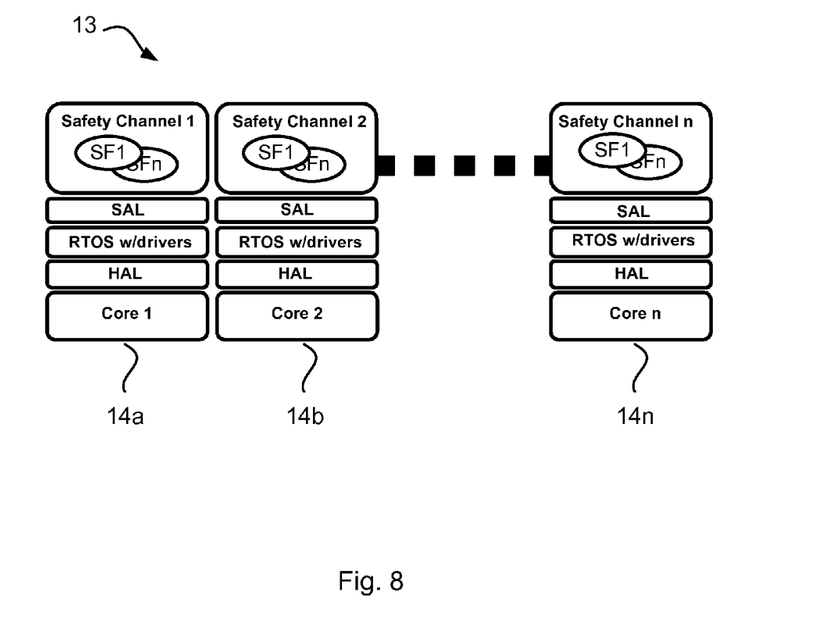
FIG. 8 schematically illustrates partitioning of processing resources.

The RTOS platform generally complies with a Dynamic Adaptive Diagnostic (DAD) functionality. The DAD functionality is a framework made adaptable to different hardware and software platforms. The configuration valid for this DAD may comprise one to several partitions (SCs) executing SSA and DSA. The partitioning, as in step S104, may be regarded as a vertical separation of processing resources 14a, 14b, . . . , 14n as schematically illustrated at reference numeral 13 in FIG. 8. Here a typical configuration for a multicore safety system is illustrated, where the vertical separation is done all the way from hardware to SC. Partitioning of resources available for safety and scheduling of what to run where and when, is handled by the Safety Platform (SP) which may be implemented by the controller 2. The SP can be regarded as a generic support bed serving SSA with an M-out-of-N-diagnostic (MooNd) structure, where:

M is the number of safety channels needed to demand the safety function before it can take place, N is the number of safety channels available in parallel, and d is the diagnostics channel executed in parallel to N supervising the channels.

If a fault is detected in a channel the DSA is able to adjust the voting output to go in favor of the non-faulty channel. If execution of the DSA detects fault in all channels or a discrepancy not possible to allocate to a specific channel, the DSA is arranged to set the system to a safe state.

In an execution phase the SP will make sure the platform has required resources available by continuously executing planned diagnostic functionality (by means of executing the DSA, see below) in separate SCs. This is achieved by the Diagnostic module at different layers in hardware (internal and/or external watchdog), low level diagnostics related to HAL (Hardware Abstraction Layer) and drivers (like ECC error correction/detection with scrubbing and fault localization/injection), SAL for software error support handling RTOS interface with exceptions, supervision of the SC making sure processes, tasks and interrupts and shared resources are balanced and are working with the possibility to do a repair (reload program, etc.), or any combination thereof.

In this way the SSA is released from the burden of assuring used resources are proven reliable at any time. SP in itself is made independent of RTOS and drivers hidden by the Safety Abstraction Layer (SAL). The partitioning of what is to be handled by the RTOS and the Safety Platform may generally depend on the RTOS used.

Figure 9:
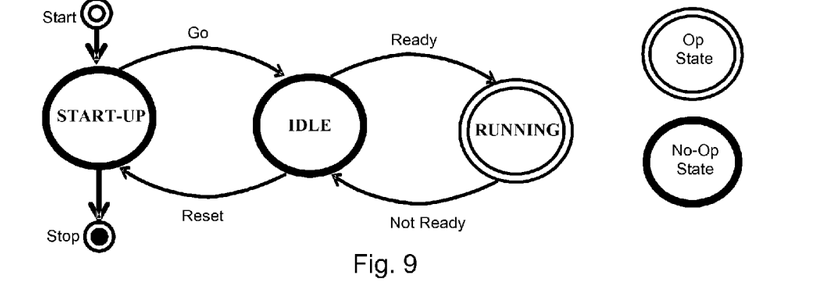
FIG. 9 is a state diagram for fault detection according to embodiments.

The Safety Platform (SP) holds the overall state of all resources and Safety Channels (SC) available to run DSAs and may have three modes of execution as will be further disclosed next. It has a START-UP phase followed by an IDLE phase. When minimum required resources (SCs) are made available to run the DSA, it enters the RUNNING phase. Returning to IDLE from RUNNING occurs when such minimum required resources no longer are available. FIG. 9 illustrates a SP state diagram comprising these three states. State transitions are shown by arrows and named accordingly.

Figure 10:
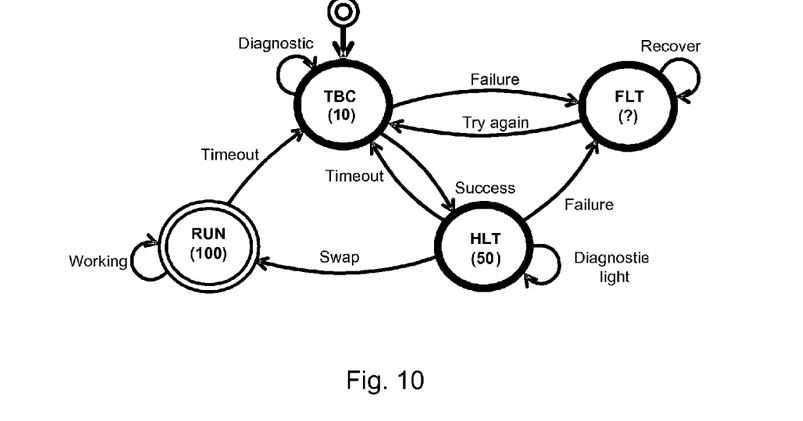
FIG. 10 is a state diagram for fault detection according to embodiments.

In general terms, the SP state diagram may not be responsible for the DSA state changes (as illustrated in FIG. 10) entering an operational state (Op State) or a not-operational state (No-Op State). However, DSAs cannot enter the Op State before the overall SP (as illustrated in FIG. 9) is in the RUNNING state. This also implies that DSAs can be in the No-Op State when the SP is in the RUNNING state, meaning a DSA has detected a potential fault situation, but everything in the SP is fully operational.

Next follows a detailed explanation of the SP states and transitions (as in FIG. 9). At power-on the SP is responsible for initialization and configuration with basic diagnostics (bootstrap) defined as START-UP. It will prepare the system to be able to run the multiple partitioned modes IDLE and RUNNING. How this is implemented may vary depending on processor architecture.

According to one embodiment the following procedure will be executed in the START-UP state: SP prepares the entire system by running an overall Basic Diagnostics to verify system ready. This diagnostic should not overlap with the diagnostics associated with the individual state diagram in FIG. 10, see below. The SP will then set up partitions and common resources (memory, communication, GPIOs, interrupts, etc.) with required software (SSA, SP, RTOS and drivers) and verify that data associated therewith is loaded correctly. Each partition (SC) will take over execution responsibility entering the IDLE state, as marked by the transition Go. The shared Health table (as in Table 1, see below) is used to hold the state of each SC at the same time as it gives a summation overview used to define the SP state. If the basic diagnostics or any other item fails, the system will immediately be halted, as marked by Stop.

According to one embodiment the following procedures will be executed in the IDLE state: The SP executes the Individual state diagram (as in FIG. 10) in each SC making sure required resources are prepared and made available. When the required number of SCs is available the SP state diagram enters the RUNNING state, as marked by the transition Ready. If the required number of SCs is not satisfied after a defined timeout (as monitored e.g. by a watchdog functionality), the system is Reset back to the START-UP state.

According to one embodiment the following procedures will be executed in the RUNNING state: The SP executes the Individual state diagram (as in FIG. 10) in each SC making sure required resources are made available. A required number of DSAs must be running for the SP to remain in this state. SC is regularly taken out of service (i.e., released from executing the SSA) to run the DSA. When a logical unit (partition, SC) has finished the DSA successfully, it will make itself available by inserting itself into the Ready Queue and updating the Health table. If the required number of SCs is not satisfied, the system is translated back to the IDLE state, as marked by Not Ready. The SP is acceptable to remain in the RUNNING state, even if a SC failed diagnostic as long as the number of available resources is sufficient. The reason why diagnostics failed may be examined thoroughly, making sure it does not affect system stability.

In the start-up operating mode fault detection is executed by, prior to the step of partitioning in step S104, performing, in an optional step S102, initial diagnostics. In general terms, the initial diagnostics may be performed as bootstrap at power-on or as a result of a hardware reset and comprise basic register setup, boot strap diagnostics, etc.

In the running operating mode (i.e., in the RUNNING state of FIG. 9) fault detection is executed as in any of steps S110a, S110b, S110c, S112a, S112b, and S112c as will be disclosed next. The fault detection diagnostics (DSA) in the running operating mode may comprise any combination of instruction test (such as branch, move, compare, add, multiply, etc.), register test (such as read/write to detect stuck-at, etc.), peripheral test (such as verification of configuration file— CRC, etc.), stack test (preferably only push and pop, not individual stack overflow, etc.), data bus test, address bus test (for example by setting each address pin to 0 and 1 not affecting others, etc.), RAM test (such as read/write to detect stuck-at, etc.), and ROM test (for example using a 32-bit CRC error detection algorithm).

The number of partitions to be used for safety can vary depending on requirements and needs. There may be a minimum of two partitions executing the DSA. This will enable redundancy with the possibility to compare results. The health verification is done by the diagnostics functionality (i.e., the DSA).

According to one embodiment executing the DSA in step S110 further comprises an optional step S110a of performing fault detection of the logical unit on which the DSA is executed. According to this embodiment the logical unit is, in an optional step S110b, labelled as healthy if passing the fault detection and faulty otherwise. According to this embodiment the SSA is, in an optional step S110c, prevented from being executed on a logical unit labelled faulty. FIG. 10 illustrates a state diagram where fault detection of a single partition (logical unit) is illustrated according to such an embodiment. The state labels are shown in capital letters. In FIG. 10 the number in parenthesis is the assumed approximate time slice dedicated to the different modes when everything is operating normally. State transitions are marked by arrows and named accordingly. In FIG. 10 the following functionality is associated with the illustrated state diagram (the functionality of which may be implemented by the controller 2).

TBC (To Be Checked): In this state the DSA is executed, thus performing diagnostics. No execution of SSA is allowed while the DSA is being executed. The outcome of executing the diagnostics will result in either failure (FLT) or success (HLT). If the waiting time in the HLT state before entering the RUN state expires or if not responding in the HLT state, a supervising watchdog functionality is arranged to return the logical unit under consideration to the TBC state. Before the state is changed from RUN to TBC the SSA must have been swapped to another SC.

According to one embodiment the requirements for how to handle transitions into TBC the state include at least one of the following considerations: Execution of the SSA is not allowed and if so the system is defined unsafe. If a non-safety related functionality is executed it should in general be allowed to do so until completed. However, if the execution of the non-safety related is not completed within a predetermined time limit the execution thereof is forced to stop by entering the FLT state. The DSA will start to be executed as soon as nothing else is executed, the DSA thus having full control of the entire logical unit for optimized performance, thus reducing the time in the TBC state.

HLT (Healthy): In this state further diagnostics are run while in queue for executing the SSA. This state is entered after successful diagnostic (as in the TBC state). The logical unit having passed the check in the TBC state is scheduled into a queue of readily available logical units to be used by the SSA until ready to swap. While waiting for the swap the further diagnostics are executed on the logical unit to ensure that the healthy state of the logical unit is preserved.

According to one embodiment the further diagnostics comprise a (distinct) subset of the full diagnostic instructions in the DSA and includes the possibility to stop immediately when ready to enter the RUN state, see below. A logical unit in the HLT state can also be trusted for verification required by a faulty (FLT) logical unit. If the diagnostic fails the logical unit will enter the FLT state. In addition a timeout supervises the SC and may return the logical unit to the TBC if it stays too long in the HLT state.

RUN (Running) executing SSA: In this state required SSAs are executed in the safety loop for a defined time before execution of the DSA is again required, thus returning the logical unit to the TBC state. Execution of the SSA functionality is only allowed when in this state. According to one embodiment, no other application is allowed to be executed on this logical unit when the SSA is being executed.

According to one embodiment the requirements for a logical unit to be selected for execution of Safety Critical instances of the SSA involves at least one of the following considerations: The core 8a-n must be healthy. The core 8a-n selected must not already execute, or otherwise be involved with, Safety Critical instances of another SSA. Synchronization between the Safety Critical instances of the SSA must be supported so they individually can compare result and make decisions.

FLT (Faulty) executing recover function: After the DSA has detected a fault in the logical unit, the SC cannot be trusted. Execution of the SC on the logical unit is stopped and all further activities towards this logical unit are handled under control of another healthy SC. A fault analysis can be performed to decide fault criticality (such as whether the fault is permanent or if further diagnostics should be executed after a timeout) and fault effect (such as if only one logical unit is affected or if the entire multicore environment is affected). Depending on the outcome thereof one action may involve a SC repair with re-initialization of memory. Nothing but repair under full control of another healthy logical unit may be allowed to be executed on this logical unit. Further, for further test purposes a logical unit labelled as faulty might be forced to enter the TBC state again by another healthy logical unit.

According to embodiments the controller 2 is thus arranged to, in an optional step S112a, prevent the SSA from being executed on a logical unit on which fault detection has not been performed at all or if fault detection has not been performed within a predetermined duration in time. A logical unit denoted healthy is, in an optional step S112b, scheduled for execution of the SSA. For a logical unit denoted healthy, additional fault detection may, in an optional step S112c, be performed until the logical unit denoted healthy is scheduled to execute the SSA.

In general terms, all healthy cores 8a-n may be regarded as being part of a pool of resources available to the SSA. When a core 8a-n is labelled unhealthy it is treated on an individual basis. Cores 8a-n no longer working are thus labelled FLT (Faulty) and should be made sure not to disturb operational activity. In general terms, cores 8a-n labelled TBC may be regarded as no longer healthy, but may still be used to execute non-safe functionality.

In general terms, the further diagnostics may be the same diagnostic as in the DSA, but with the possibility to stop immediately when an external event occurs, like receiving a Mutex (a mutual exclusion). This forces the interface to the further diagnostics to be configured in such a way that it can be scheduled to run for a minimum of time. For example, the interface to the memory test may have two parameters, one for memory start position, and one for memory length. In this way the memory test could be a single 32-bit word, but the implementation of the test is the same for the ordinary DSA.

A common data area, e.g. represented as a table, may be used by all safe partitions or Safety Channels (SC) to share data among themselves. In general terms, the data is not persistent meaning it should not be stored before power down. Initially the table should be created depending on the content in a configuration file making it easy to perform changes thereto. Further properties of the configuration file will be disclosed below.

According to one embodiment the controller 2 is therefore arranged to, in an optional step S114, share first data relating to the execution of the DSA by a first logical unit with second data relating to the execution of the DSA by a second logical unit. Execution of the SSA may then, in an optional step S114b, be scheduled based on the shared first and second data. As the skilled person understands, there may be also third data, fourth data, etc., which may be shared and on which the scheduling may be based.

Below is an example snap shot of an 8 partition (8 SC) configuration with the value 1 indicating active and 0 for inactive. The bottom summation indicates only one mode active at any time for each channel. The right summation is the number of channels active in each mode. The following labelling is used: (a) indicates SC not ready to run SSA, (b) indicates SC ready to run SSA, but not yet executed (in queue), and (c) indicates SC currently executing SSA.

TABLE 1

State vs. channels

| | SC1 | SC2 | SC3 | SC4 | SC5 | SC6 | SC7 | SC8 | Sum |
|---|---|---|---|---|---|---|---|---|---|
| TBC | 0 | 0 | 0 | 0 | 0 | 1(a) | 1(a) | 0 | 2 |
| HLT | 0 | 0 | 1(b) | 0 | 1(b) | 0 | 0 | 1(b) | 3 |
| RUN | 1(c) | 1(c) | 0 | 0 | 0 | 0 | 0 | 0 | 2 |
| FLT | 0 | 0 | 0 | 1(a) | 0 | 0 | 0 | 0 | 1 |
| Sum | 1 | 1 | 1 | 1 | 1 | 1 | 1 | 1 | 8 |

For each SC additional information may be registered. Examples include, but are not limited to any of statistics counters for each time the different modes have been entered, optionally with a timestamp for a last change, individual watchdog timers for each SC making sure it is not locked up, triggers and handles like events, mutual exclusions (so-called "mutexes") or messages for signaling other partitions, communication rerouting making it possible to setup a communication channel once, but change which SC is active.

Rules for accessing the table may be applied. All SCs should be allowed to read data from other SCs, but updating is only allowed by the SC owning the data. However, this may depend on the current state of the SC; for example, SC2 is the only SC allowed to update data related to this channel, but according to one embodiment this cannot be done if in FLT mode. There may be a condition that when in the FLT state, another SC in the HLT state must confirm the update.

A configuration file could be used for configuration and setup of the system. The configuration file should follow standards for this kind of tasks, meaning the configuration file should have the correct format (such as XML) and correct content (according to an application domain). The configuration file could be stored in a Flash memory with CRC protection. The configuration file may comprise information such as:
  Partitions: N in the MooN configuration, where N decides the number of partitions running SF at the same time. The total number of partitions (SCs) available running safety (preferably greater than N).
  Timeouts and timers: Setting of different timers for allowed time in the different states, process safe time, watchdog timers, etc.
  Validation numbers (CRC, magic, etc.): Checksum of the different modules, common memory areas, health table, etc.

The diagnostics software application (DSA) is typically a control loop with strict time requirements. In general terms, the control loop is based on evaluating input measurement against pre-defined thresholds (which may be provided by configuration data). If the threshold is reached an output signal is generated (or removed). A simple and classical safety response is to just de-energize (power-off). The DSA may be associated with a state diagram having only two states:
  Op State=Operational state means DSA is running successfully. Whenever the DSA detects an un-safe condition or something is wrong with the system (i.e., diagnostics failed) this state is changed to the No-Op State.
  No-Op State=Not-Operational State means DSA is not running successfully. This can be caused by an un-safe condition or that something is wrong with the system running the DSA. To re-enter the Op State a restart of the system may be required.

Other states could also be used depending on the state diagram implementation.

Two DSA instances may be required to run in two different partitions (such as SC1 and SC2). This is only possible when the Individual state diagram of FIG. 10 is in the RUN state for each DSA, thereby automatically setting the SP in the RUNNING state (as illustrated in FIG. 9).

In general terms, the DSA may satisfy the following requirements: the number of safety instances should be configurable (herein referred to as MooN); the Process Safety Time (PST) should be configurable; deterministic behavior should be shown (half the PST); realistic CPU load should be generated to verify that the safety-critical function is working properly; synchronization mechanism between safe channel for regularly cross compare should exist; safe channel communication (as may be provided by black channel with input and output devices, see above); real-time processing and performance measurement performance; and/or verification that the DSA is working as defined. Only one instance of the DSA should run in one logical unit, but several different DSAs could be executing in the same logical unit.

As disclosed above, immediately when a SC has successfully passed the diagnostics as performed by the DSA the SC will enter the HLT state and queue up for SSA execution. According to one embodiment the first SC to queue will be the first SC to execute the SSA (according to the first in first out, FIFO, principle).

Figure 11:
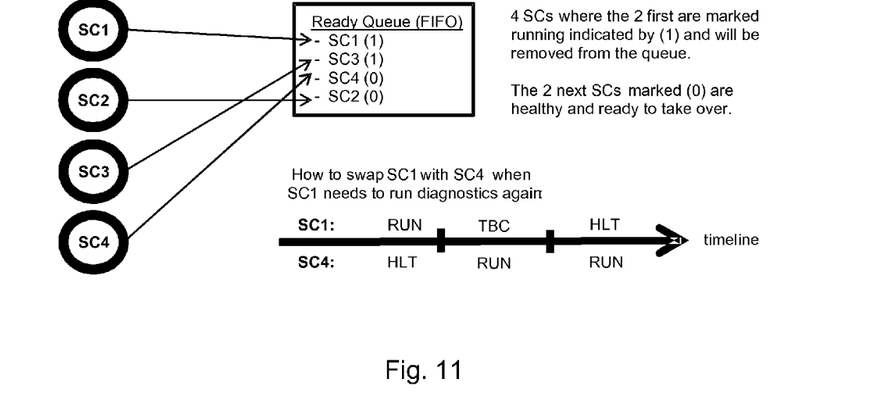
FIG. 11 schematically illustrates scheduling of safety channels.

FIG. 11 schematically illustrates a scenario where a total of 4 SCs are available for executing a safety configuration and where 2 SCs must be active all the time. At initial start-up (for example after having performed step S102) SC1 is ready first, then SC3 and SC4 and finally SC2. According to the present scenario SC1 will run the SSA (and thus enter the RUN state in FIG. 10), then SC3 will do the same as the second logical unit to be ready. The two remaining logical units will have to wait until one of the executing SCs enters the TBC state. While waiting in the HLT state the logical units are subjected to further diagnostics to ensure their health status is updated. An illustrative scenario relating thereto will be disclosed next.

1. SP is in the START-UP state running single bootstrap. No SC has started yet.

2. SP will enter the IDLE state and all SC will start in the TBC state.

3. SC will be inserted into the Ready Queue with SC1 as ready first, then SC3, SC4 and finally SC2, all with the HLT state and with the SP still in the IDLE state.

4. SC1 will be the first to run SSA entering the RUN state. The SP state will remain IDLE.

5. SC3 will be the second to run SSA also entering the RUN state. Now two instances of SFs are running which may be required to change the SP state to RUNNING, meaning the multicore processor environment is ready and available to run required SSA. Note that it is the SSA that may decide whether its state should change to operational.

6. The two remaining logical units will have to wait until one of the running SCs enters the TBC state. While waiting they must make sure to keep their health status updated. This is achieved by performing further diagnostics. The further diagnostics may be interrupted when ready to swap (see step 7).

7. The swap from SC1 to SC4 is the next step and is shown in the lower part of the FIG. 11. This could be done with help from the RTOS functionality release Mutex by SC1 and reserve Mutex by SC4.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for multicore processor fault detection during execution of safety critical software applications in a multicore processor environment, the method comprising:
   partitioning processor cores of the multicore processor environment into at least two logical units;
   dedicating all processing resources of one of the at least two logical units to execution of a diagnostics software application (DSA), the DSA being arranged for fault detection of a processor core of said one of the at least two logical units;
   dedicating processor resources of at least one of the remaining logical units to execution of a safety-critical software application (SSA); and
   executing the DSA by said one of the at least two logical units whilst in parallel executing the SSA by said at least one of the remaining logical units.

2. The method according to claim 1, wherein executing the DSA further comprises:
   labelling the logical unit on which the DSA is executed as healthy if passing the fault detection executed by the DSA and faulty otherwise; and
   preventing the SSA from being executed on a logical unit labelled faulty.

3. The method according to claim 2, further comprising:
   preventing the SSA from being executed on a logical unit on which fault detection has not been performed at all or for a logical unit on which fault detection has been performed within a waiting time;
   scheduling a logical unit denoted healthy for execution of the SSA; and
   for said logical unit denoted healthy, performing additional fault detection until said logical unit denoted healthy is scheduled to execute the SSA.

4. The method according to claim 3, wherein the fault detection is associated with a start-up operating mode and a running operating mode,
   wherein in the start-up operating mode, fault detection is executed by, prior to the step of partitioning, performing initial diagnostics; and
   wherein in the running operating mode, fault detection is executed as in any of the following steps:
      performing fault detection of the logical unit on which the DSA is executed,
      labelling the logical unit as healthy if passing the fault detection or faulty if failing the fault detection,
      preventing execution of the SSA on a logical unit labelled faulty,
      identifying on which of the processor cores the SSA is executed and executing the DSA on the identified processor cores,
      preventing the SSA from being executed on a logical unit on which fault detection has not been performed within a predetermined duration of time,
      scheduling a logical unit identified as healthy for execution of the SSA, or
      for the logical unit identified as healthy, performing an additional faulty detection until the logical unit is scheduled to execute the SSA.

5. The method according to claim 1, further comprising:
   sharing first data relating to the execution of the DSA by a first logical unit with second data relating to the execution of the DSA by a second logical unit, wherein the first data and the second data are shared by means of a common data area; and
   scheduling execution of the SSA based on said shared first and second data.

6. The method according to claim 1, wherein partitioning processor cores further comprises:
   defining a diagnostics model comprising at least one safety channel; and wherein the DSA is executed at least on all logical partitions associated with the at least one safety channel.

7. The method according to claim 1, wherein executing the DSA further comprises: identifying all processor cores on which the SSA is executed and executing the DSA only on said identified processor cores.

8. The method according to claim 1, wherein each logical unit corresponds to a fractional part of the processor core.

9. The method according to claim 1, wherein each logical unit corresponds to an integer number of processor cores.

10. The method according to claim 1, wherein the SSA is a control application of an industrial control system, the control application relating to on-line safety control of real-world control objects.

11. The method according to claim 10, wherein the real-world control objects are sensors, actuators, valves, motors, drive systems, gas/smoke/fire detection systems, drilling equipment, pipes and pipelines, distillation columns, compressors, conveyor systems, boilers or turbines.

12. A controller for multicore processor fault detection during execution of safety critical software applications in a multicore processor environment, comprising:
   the multicore processor environment arranged to partition processor cores of the multicore processor environment into at least two logical units;

dedicate all processing resources of one of the at least two logical units to execution of a diagnostics software application (DSA), the DSA being arranged for fault detection of a processor core of said one of the at least two logical units;

dedicate processor resources of at least one of the remaining logical units to execution of a safety-critical software application (SSA), and execute the DSA by said one of the at least two logical units whilst in parallel executing the SSA by said at least one of the remaining logical units.

13. A control system comprising at least one controller for multicore processor fault detection during execution of safety critical software applications in a multicore processor environment, said control system having:

the multicore processor environment arranged to partition processor cores of the multicore processor environment into at least two logical units;

dedicate all processing resources of one of the at least two logical units to execution of a diagnostics software application (DSA), the DSA being arranged for fault detection of a processor core of said one of the at least two logical units;

dedicate processor resources of at least one of the remaining logical units to execution of a safety-critical software application (SSA), and execute the DSA by said one of the at least two logical units whilst in parallel executing the SSA by said at least one of the remaining logical units.

14. A computer program product comprising a computer program for multicore processor fault detection during execution of safety critical software applications in a multicore processor environment, and a non-transitory computer readable medium on which the computer program is stored, the computer program when executed on a controller causes the controller to:

partition processor cores of the multicore processor environment into at least two logical units;

dedicate all processing resources of one of the at least two logical units to execution of a diagnostics software application (DSA), the DSA being arranged for fault detection of a processor core of said one of the at least two logical units;

dedicate processor resources of at least one of the remaining logical units to execution of a safety-critical software application (SSA); and execute the DSA by said one of the at least two logical units whilst in parallel executing the SSA by said at least one of the remaining logical units.

\* \* \* \* \*